MAGNETIC MEMORY SYSTEM

Filed Oct. 16, 1963 4 Sheets-Sheet 1

INVENTORS
Alfred H. Faulkner, &
Seymour Markowitz
BY Hugh L. Fisher
ATTORNEY

MAGNETIC MEMORY SYSTEM

Filed Oct. 16, 1963 4 Sheets-Sheet 2

INVENTORS
Alfred H. Faulkner, &
Seymour Markowitz
BY Hugh L. Fisher
ATTORNEY

INVENTORS
Alfred H. Faulkner, &
BY Seymour Markowitz
Hugh L. Fisher
ATTORNEY

INVENTORS
Alfred H. Faulkner, &
BY Seymour Markowitz
Hugh L. Fisher
ATTORNEY

United States Patent Office 3,346,847

Patented Oct. 10, 1967

3,346,847

MAGNETIC MEMORY SYSTEM

Alfred H. Faulkner, Redondo Beach, and Seymour Markowitz, Los Angeles, Calif., assignors to General Motors Corporation, Detroit, Mich., a corporation of Delaware Filed Oct. 16, 1963, Ser. No. 316,682
12 Claims. (Cl. 340—172.5)

ABSTRACT OF THE DISCLOSURE

A random access magnetic memory for digital information. A segmented configuration is described wherein an odd and an even numbered storage location are simultaneously accessed by coincidence of current through an odd-section row line, an even-section row line and a column line common to both sections. Address decoding apparatus responds to initial address bits to sequence access to memory for remaining bits in various memory segments having separate sense lines to lower duty cycle of sense amplifiers.

This invention relates to digital information storage and retrieval systems commonly called memory systems and, more particularly, to a random access memory system utilizing coincident current selection techniques.

Digital memories generally include an array of storage elements, each of which is capable of storing, either permanently or temporarily, an amount of coded digital information. Access to this memory must be provided to extract or read out the information stored in the memory, to insert or write information into the memory or to perform a combination operation in a cyclic manner. It is not uncommon to use magnetic cores for the storage elements. Magnetic memory cores are characteristically made of square loop material such that each element has two stable remanent magnetic states of opposite polarity which are capable of representing different values of digital information. Each of the cores may be switched between the two states by means of lines threading the elements and carrying currents of a net magnitude sufficient to provide a flux field which exceeds the coercive force required to reverse the flux condition in the element. In a coincident current memory an array of magnetic elements may be divided into rows by row selection lines or conductors and into columns by column selection lines or conductors. Access to the memory for reading or writing purposes is provided by means of programmable switching means to selectively direct current through a particular combination or row and column lines. The current through the row and column lines is selected such that a coincidence of two currents is required to switch one of the magnetic core elements from one of the stable states to the other; thus, only one magnetic element will be switched, that being the element linked jointly by the energized row and column lines. The magnetic elements in the array may be selected in this manner either for reading information out of the memory or for writing information into the memory. To detect the information during the readout portion of the cycle a sense winding is threaded through the elements of the array. Such a single sense winding, of course, contemplates a series type readout.

The present invention contemplates a coincident current memory system employing storage elements having two stable remanent states and including a plurality of switch means connected to corresponding row and column lines for providing access to the memory for reading and writing operations. More specifically, the invention contemplates a memory which is effectively divided into two portions, which two portions share common column selection lines but which have separate row selection lines and addressable switch means for selecting the lines. Decoding means is provided for receiving a digital address which may, for example, appear in the usual two's complement form and for distributing certain bits thereof to the column selection switch and other bits thereof to each of the row selection switches.

Accordingly, the memory operates in what is called a serial-by-two operation in which, although a substantially serial operation, two bits may be read or written at one time. In a particular embodiment, an odd and an even bit of the addressed word may be simultaneously read or written. As will be further seen in the following, the memory requires energization of only three lines by respective and independent switch means to obtain a double current coincidence in both of the two portions of the memory to perform a read operation or to write binary ones into both portions of the memory. It is to be understood that a two-dimensional memory array contemplates the schematic representation thereof irrespective of packaging, and the terms "row" and "column" are not to be interpreted as vertical and horizontal but are only indicative of the two dimensions of the memory array.

Considering the memory in greater detail, the individual row and column line selection means are responsive to a decoded signal from an address decoding means to energize the combination of a row selection line in each portion of the memory and a column selection line linking both portions of the memory to read out the digital information contained at two locations in the memory. It can, thus, be seen that a write operation can be accomplished by inhibiting one of the coincident currents required to switch a storage element from one state to the other. Accordingly, a column selection means may energize a selected line during both read and write operations; however, the row selection means may be inhibited to write a "0" into either or both portions of the memory.

A further feature of the invention lies in a segmentation of the memory as regards output sensing to improve the signal to noise ratio, and also the reliability of the sensing amplifier means by lowering the duty cycle of individual amplifiers and, thus, minimizing level shift problems. This is accomplished by employing a plurality of sensing lines, each of which links the elements of a predefined segment of the memory array and a plurality of amplifier means divided into groups corresponding to the two portions of the memory. Where the portions are even and odd, each of the amplifier means associated with the even portion of the memory is connected to a plurality of the separate sense lines, each of which is associated with a segment of the array having a combination of row and column selection lines which is distinct from all of the other segments of the array. Similarly, each of the amplifier means associated with the odd portion of the memory is connected to a plurality of sensing lines linking mutually exclusive segments of the row and column selection lines. By providing a plurality of sense lines and amplifier means in each portion of the memory, the number of magnetic elements linked by any one sense line and the number of times any amplifier means is operated in succession is reduced to a minimum which correspondingly minimizes level shift problems in the amplifier means due to low frequency components resulting from unfavorable information storage patterns.

A further feature of the invention is the provision of novel selection apparatus for selecting the row and column lines of the memory for energization. As previously stated, separate selection means are provided for energization of the column lines of the memory, the row lines associated with one portion of the memory and the row lines associated with the other portion of the memory. Each of the selection means is addressable from a decoding apparatus to select a particular line associated therewith as part of the overall selection of two locations in the memory for information reading and writing.

Describing the selection means in greater detail, it will be shown that the selection means associated with either row or column lines in the memory are substantially similar and each includes a two-dimensional array of switching elements each of which has two stable states between which the element may be switched by an external signal of predetermined character. Each of the selection means is addressable to produce a double coincidence of signals to addressably select a particular switching element which, in turn, is associated with a particular row or column line in the memory array. Each of the selection means further comprises individual means for applying signals for selection purposes to rows and columns of switching elements, such that a particular row and a particular column may be selected to switch the switching element occurring in both the row and column to the other of its two states. This switching thus steers current through a particular row or column line running into the memory array. The selection means cooperates with the previously mentioned address decoding means to locate, according to a digital address, the initial bits of a word to be read from or written into the memory and to automatically locate the remaining bits of the word by coincidently selecting additional elements in the selection means in a predetermined sequence, dependent upon the original address. In accordance with the present invention, means are provided to select the subsequent locations in such a fashion that no row or column selection line in the selection means is energized twice in succession. This provides the advantage of allowing a switching element once selected to be completely reset before any switching element on the same row or column line is selected, but while another switching element is being set, thus increasing the speed of the selection means operation.

The invention, as well as further features and advantages thereof, will become more apparent upon the reading of the following specification which describes in detail a specific embodiment of the memory system. This description is to be taken with the accompanying drawings of which:

*FIGURE 1*

Figures 1, 1A:
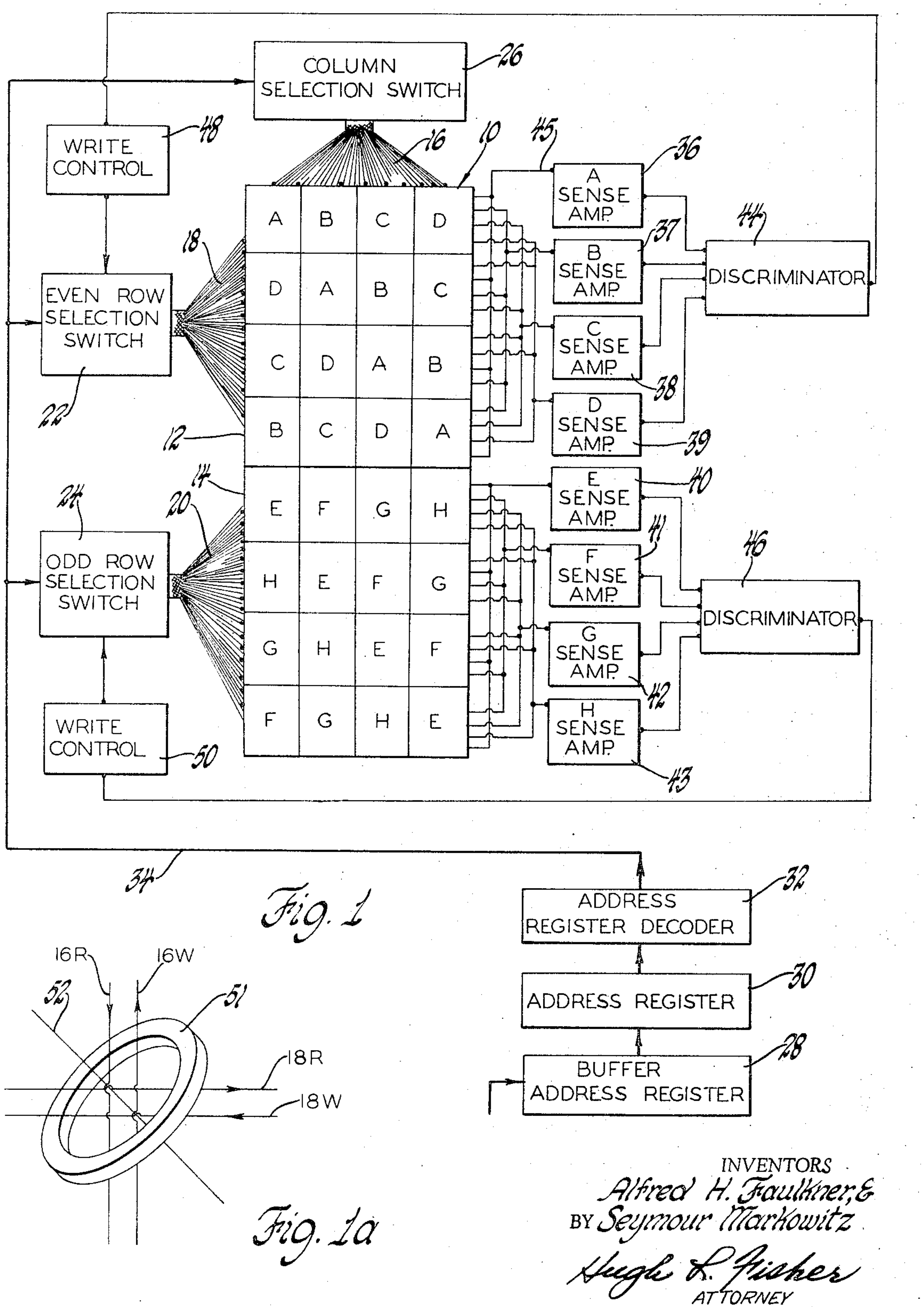
FIGURE 1 is a block diagram of the memory system.
FIGURE 1A shows the nature of a memory element in the system of FIGURE 1.

Referring now to FIGURE 1, there is shown in block diagram form a random access memory employing a two-dimensional array 10 of magnetic storage elements, each having two stable states representative of different values of digital information. The array 10 is shown divided into an "even" bit portion 12 and an "odd" bit portion 14 which are used in accordance with the invention, to store bits which correspond with the even and odd bits of a word. The particular storage elements in the memory array 10 are addressably selected for read and write operations through the instrumentality of column selection lines, indicated at 16, even row selection lines 18, and odd row selection lines 20. The selection means takes the form of an "even" row selection switch 22, an "odd" row selection switch 24 and a column selection switch 26. The even row selection switch 22 operates to selectively steer a signal to one of the plurality of row selection lines 18 which link respective rows of storage elements in the even bit portion of the memory array 10. Similarly, the odd row selection switch 24 operates to selectively steer a signal to one of the plurality of row selection lines 20 which link respective rows of storage elements in the odd portion of the storage array 10. The column selection switch 26, on the other hand, operates to selectively steer a signal to one of the plurality of column selection lines 16 which link respective columns of storage elements in both the even and odd portions of the memory array 10. In this arrangement, each of the column selection lines 16 is common to both portions 12 and 14 of the memory array 10. As further indicated in FIGURE 1, information is delivered to the switches 22, 24 and 26 for the selective energization of particular row and column lines corresponding with a digital address by means of the combination of a buffer address register 28 which functions to receive a digital address and to distribute, in parallel fashion, the various digits thereof to an address register 30. It is to be understood that the heavy arrow connections between the various block elements of FIGURE 1 are representative of a multi-channel information transfer system which is well known to those skilled in the art. The digital address, once received in the address register 30, may be gated by means of a clock, not shown, into an address register decoder 32. The address register decoder 32 functions to decode the address received from the register 30 and to modify the address for compatibility with the operation of the switches 22, 24 and 26, and to present the address to the switches by means of an information transfer channel generally indicated at 34. Again, while the information transfer channel 34 is indicated as a single line, it is to be understood and will be brought out in further detail in the following portions of the specification that separate portions of the address register decoder 32, which are individually responsive to various portions of the address, are connected to the corresponding switches 22, 24 and 26.

As will be made apparent in this specification, the memory is operable in a read-restore or clear-write fashion. Briefly describing a read operation of the system as presented thus far, the buffer address register 28 may receive a binary address in the usual two's complement form consisting of, for example, 12 bits. After being shifted into the buffer register 28, these 12 bits are transferred to corresponding portions of the address register 30 wherein separate signals are developed according to the binary value, either "1" or "0," of each bit. At a time determined by a signal from a computer control means not shown, this information is transferred into the address register decoder 32. The decoder 32 presents six bits to the even row selection switches 22 and 24 for simultaneous selection of a line in each of the odd and even portions of the memory array 10 and six bits to the column selection switch 26 for selection of a single column line. It is to be understood that the lines 16, 18 and 20 are merely representative of the read and write lines threading the memory array and more specific illustration is given in the other figures of the drawings.

In the read operation, it is desired to investigate the condition of an even and an odd storage element in the respective sections 12 and 14 of the memory array 10 to determine the information content of each of these storage elements. The selection of the first even numbered bit, as determined by the address, requires the even row selection switch 22 to steer current to a particular read line in the plurality of row selection lines 18. Similarly, a particular read line in the row selection lines 20 is also chosen by the switch 24. At the same time, the column selection switch 26 completes the coincident current selection requirements by energizing one of the column selection read lines 16. As previously stated, the column selection lines 16 run through both even and odd portions of the memory array 10 and, therefore, a double coincidence of read currents occurs in both the even and odd portions of the memory. Accordingly, two storage elements, one in the even portion 12 of the array 10 and one in the odd portion 14 of the array 10, will be interrogated or read to determine the state of the particular storage element selected.

To determinne the character of information being read from each of the selected storage elements of the array 10, the memory array 10 is divided into 16 segments which are laabelled in the drawing by letters A, B, C and D. The elements of each segment are linked by a sense winding which is peculiar to that segment alone. The sense windings of the even portion 12 of the array 10 are connected in a manner to be described to a first plurality of sense amplifiers 36, 37, 38 and 39 which are also labelled with letters A, B, C and D. Each of the sense amplifiers 36 through 39 is associated with the combination of sense windings which link the storage elements of correspondingly lettered segments of the even portion 12 of the array 10. Although omitted for the sake of simplification, it will be understood to skilled artisans that the sense winding of each segment links the memory elements in a serial fashion. The sense windings associated with the A segments of the even portion 12 are mixed through a resistive connection indicated at 45 to sense amplifier 36. Similarly, all of the sense windings associated with B portions are mixed through a resistive connection to the sense amplifier 37. The C and D portions are similarly connected to the sense amplifiers 38 and 39 respectively.

The odd portion 14 of the memory array 10 is similarly sub-divided into 16 segments, each of which is designated by one of the letters E, F. G or H. Each segment is also linked by one sense winding. The sense windings of the odd portion 14 of the array 10 are connected in a manner to be described to a second plurality of sense amplifiers 40, 41, 42 and 43, which are also labelled E, F, G and H, respectively. The four E segments, which are selected diagonally across the odd portion 14, are mixed together through a resistive connection to the input of the E sense amplifier 40. Correspondingly, the F. G and H sense windings are connected into the F, G and H sense amplifiers 41, 42 and 43, respectively. In the particular arrangement of 16 segments per half memory shown in FIGURE 1, four amplifiers are thus provided for each half of the memory array 10. The amplifiers 36, 37, 38 and 39 are, in turn, coupled to an even level discriminator 44 whereas the amplifiers 40, 41, 42 and 43 are connected into an odd level discriminator 46.

A common memory type is that employing storage elements in which the content is destroyed by a read operation. Although not limited thereto, the invention is adapted to accommodate a destructive readout operation. Thus, it may be assumed that the elements of the array 10 are toroidal ferrite cores from which information is lost in the performance of a read operation. Consequently, after a read operation, it is desired to write information back into the storage elements, such that the information stored in the memory system is available for a subsequent operation. Accordingly, the output of level discriminator 44 is connected to a write control network 48 which, in turn, is connected to the even row selection switch 22. Similarly, the output of level discriminator 46 is connected to a second write control network 50 which, in turn, is connected to the odd row selection switch 24.

To write a binary "1" into an element in either of the odd or even portions of the memory array 10, a double coincidence of current is required assuming the element to be in the "0" state following a read cycle. If only one of the two lines through a particular memory element is energized, that element will not be switched into a "1" state. Therefore, to write a binary "0" into the storage elements of the memory array, it is required only to inhibit one of the two selection lines linking a particular core. Because it is possible that a "0" may be written into the even portion 12 while a "1" is written into the odd portion 14, the row selection switches 22 and 24 are provided with individual write control networks 48 and 50 which perform the inhibit operation.

*FIGURE 1A*

To clarify the nature of the specific embodiment described above, FIGURE 1A shows a typical one of the storage elements 51 of the memory array 10 to be linked by a column read line 16R, a column write line 16W, a row read line 18R, a row write line 18W and a sense line 52. As suggested by the reference characters, element 51 appears in the even portion 12 of the array 10. The use of two wires in each selection direction through the storage elements 51 allows the output from one current generator to be steered through one line for the read operation and the other line for the write operation. This guarantees that a symmetrical drive condition will exist in each of the storage elements 51. If two drive lines in each direction are not used, it will be apparent to those skilled in the art that it is necessary to have additional selection switches and steering diodes or to have both positive and negative currents generated by separate circuits. In the latter case, the individual tolerances of these circuits must be accounted for in the overall system performance.

When it is desired to write a "1" into the storage element 51, current is directed through the write lines 16W and 18W by, for example, the even row selection switch 22 and the column selection switch 26. This double coincides of current switches the magnetic state of the element 52 and writes a "1." When it is desired to write a "0" into the storage element 51, the write control circuit 48 inhibits the even row selection switch 22 such that current is not directed through the write line 18W but is shunted away to the power supply. No inhibit operation is provided by switch 26 and thus current is directed through write line 16W. However, the double coincidence of write line currents which is required to switch the element 51 does not obtain. Thus, if the storage element has previously been interrogated and left in the "0" condition, the element will remain in that condition.

*FIGURE 2*

Figure 2:
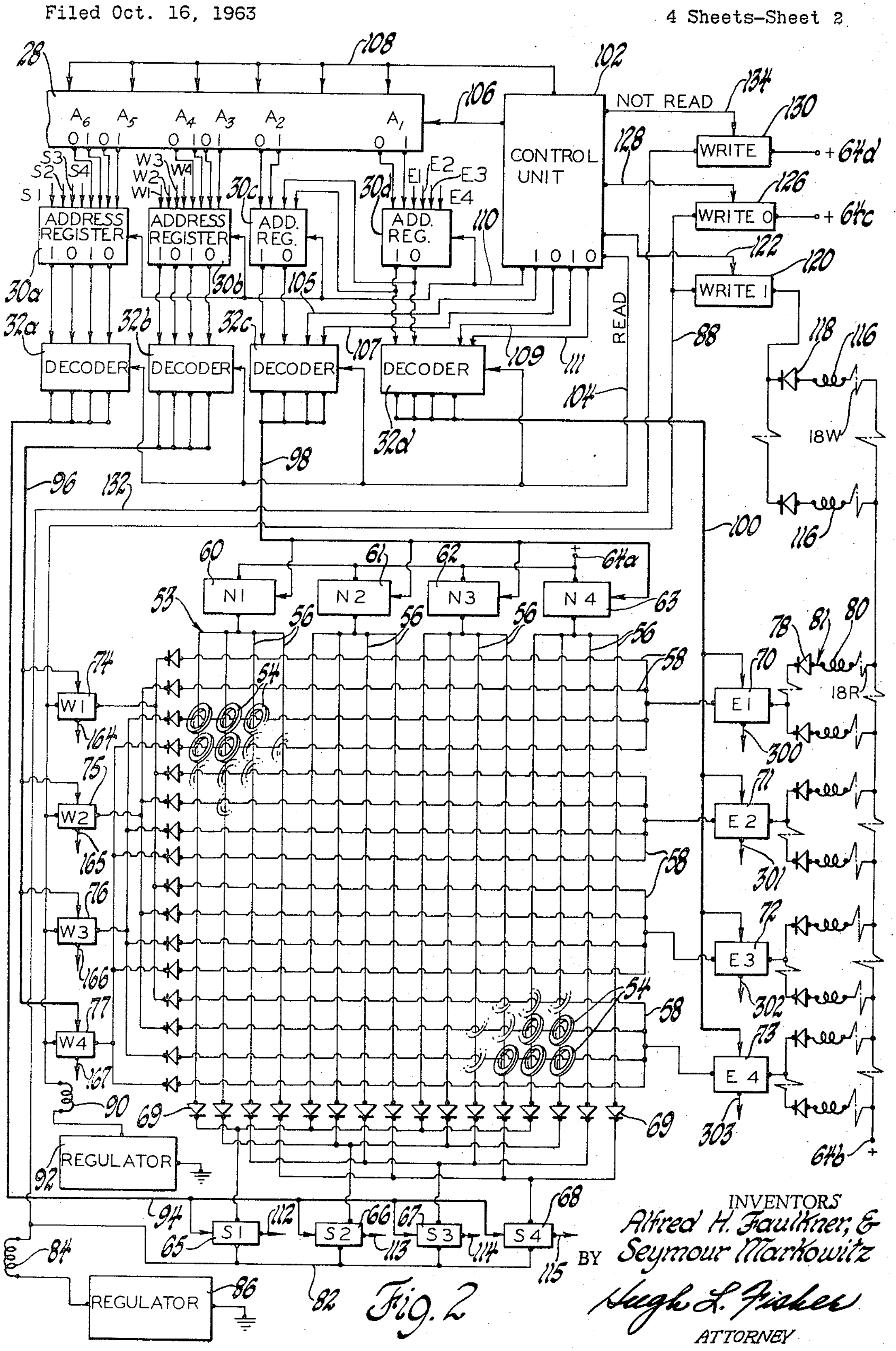
FIGURE 2 is a schematic diagram partially in block form of a portion of the memory system indicating the nature of a specific form of selection means and the connection of the selection means to the memory system.

The nature and operation of the memory system shown in FIGURE 1 will be more apparent from the detailed description of FIGURE 2 which follows. FIGURE 2 shows in partly block and partly schematic form the details of one of the row selection switches 22 or 24. As will become more apparent in the following, FIGURE 2 may also be taken as representative of the column selection switch 26 simply by deleting that equipment from FIGURE 2 which is used to generate write inhibit signals. According to FIGURE 2, each of the selection switches includes a two-dimensional array 53 of switching elements in the form of magnetic cores, suggested at 54, arranged in 16 columns and 16 rows, totaling 256 core elements in all. Each of the switching elements 54 is made of a square loop ferrite material exhibiting a high degree of magnetic remanance. Accordingly, the elements 54 may be switched between two stable states by means of a magnetic field. The elements remember the state to which they are switched, until reset, and thus are also memory elements as will be apparent upon becoming aware that the elements 54 remember the address of the memory elements of array 10 to be read for the subsequent write operation. The magnetic element array 53 is designed for coincident current switching. To that end, a plurality of column selection conductor lines 56 are threaded through the array 53 to link respective columns of switching elements 54. In addition, a plurality of row selection conductor lines 58 are threaded through the array 53 to link respective rows of the switching element 54. For the purpose of selectively directing current through the column selection lines 56, four switches 60, 61, 62 and 63, which, for purposes of discussion shall be referred to as the North switches, are each connected to a different group of four column selection lines 56. Each of the North current switches 60 through 63 is connected to a current source indicated at 64*a* and is selectively actuable by decoding means, to be described, to connect the group of four lines associated therewith to the current source. Included in the column selection switching apparatus is a plurality of South current switches 65, 66, 67 and 68. Each of the four column selection lines 56 associated with the North switch 60 is connected through a diode 69 to a different South current switch. Similarly, each of the four column selection lines connected to the North switch 61 is also connected through a diode to a different one of the South switches. The connections for the remaining column selection lines 56 are accomplished in the same fashion. Thus, it can be seen that by selection of one of the North switches and one of the South switches current may be passed from source 64*a* through only one of the 16 column selection lines 56.

The switching apparatus for selecting one of the row selection lines 58 corresponds substantially with that apparatus for selecting the column line. A plurality of East current switches 70, 71, 72 and 73 are connected to individual groups of four row selection lines. The four row selection lines connected to the switch 70 are then connected to respective switch West current switches 74, 75, 76 and 77, as are also connected, each of the groups of four row selection lines associated with East switches 70, 71, 72 and 73. Accordingly, selection of one East and one West current switch is effective to pass current through only one of the row selection lines 58.

To establish a read connection with the memory array 10 of FIGURE 1, the East current switches 70, 71, 72 and, therefore, directs current from source 64*b* through a parallel connected group of 64 channels 81, each of which comprises a diode 78, an output winding 80 which links one of the switching elements 54 in the array 53, and a read line 18R which threads a row of storage elements in the memory array 10 of FIGURE 1. Although shown in abbreviated form in FIGURE 2, there are 64 output windings 80 associated with each of the East switches 70 through 73, making 256 windings in all. The output windings 80 are effectively secondary windings on the storage elements 54 linked by the column selection lines of the switches 70 through 73. Switching of an element 54 on one of the row selection lines associated with switch 70, for example, develops an output signal in the associated output winding 80 which forward biases the diode 78 in the channel 81 linking the switch core and, therefore, directs current from source 64*b* through a specific row selection line 18R in the main memory array 10.

For current regulating purposes, each of the South switches 65, 66, 67 and 68 is connected through a main conductor 82, a series connected plurality of bias windings which link the memory elements 54 but are indicated for clarity at 84 and a current regulator 86 to ground. Similarly, the West current switches 74, 75, 76 and 77 are connected through a conductor 88, a plurality of bias windings indicated at 90 and a current regulator 92 to ground. In addition, the North, East, West and South switch groups are connected to individual decoder means for controlling the on and off periods of the switches as will be subsequently described.

In addition to being linked by column and row selection lines 16R and 18R, and output windings 18W, each element 54 of the array 53 is also linked by the bias windings 84 and 90. The bias windings 84 and 90 are indicated as lumped reactances. However, it should be noted that all of the bias windings 84 are connected in series as are the windings 90. The bias windings 84 and 90 carry constant current, as insured by the regulators 86 and 92, for biasing the elements to one of the stable remanent states. Thus, the coincident current selection requires one unit of current to overcome the bias and the other unit to switch the element. The bias is here provided by two separate windings 84 and 90 to eliminate the need for a large separate inductance normally present in such an arrangement to obtain the rise time desired of the current in the row and column selection lines.

The enabling input of each of the South switches 65 through 68 is received through a four conductor cable 94 from the four outputs of a first decoder 32*a*. Note that the decoder 32*a* corresponds with a portion of the address register decoder 32 of FIGURE 1. The enabling inputs of the West switches 74 through 77 are received through a four line cable 96 from the four outputs of a second portion of the decoder indicated at 32*b*. Similarly, the North switches 60 through 63 are connected via cable 98 to decoder 32*c* and the East current switches 70 through 73 are connected via cable 100 to decoder 32*d*.

As described above, the decoder means 32 consists of four sections, each of which is associated with a different bank, either North, South, East or West, of current switches. The decoder 32 is essentially a logic network which is responsive to a digital input to enable one of the associated current switches at a particular time. As shown in FIGURE 1, the decoder 32 receives input signals from an address register 30. This is indicated in FIGURE 2, in which separate portions of the address register 30 are shown in block and are identified as 30*a*, 30*b*, 30*c* and 30*d*. Address register 30*a* consists of two bistable sections, each of which has two outputs which can be complementally energized and which are indicated as "1" and "0" thus making four outputs in all. The four outputs are connected into the decoder 32*a* and are effective to produce one of four possible outputs from decoder 32*a*. Similarly, decoder 32*b* receives input signals from address register 30*b*, which is similar to address register 30*a*. Decoder 32*c*, however, receives one of two possible inputs from address register 30*c*, which is essentially a single section device capable of producing either a "1" or "0" output. Also connected to the decoder 30*c* are lines 105 and 107 which carry complementary signals from the control unit 102. In a like fashion decoder 32*d* has two complementary inputs which are received from address register 30*d*, and two further complementary inputs on lines 109 and 111 from control unit 102. In addition, each of the decoders 32*a*, *b*, *c* and *d* receives an enabling input from the main computer control and timing section 102 via line 104. This line receives what will be termed a read pulse from the main computer control and timing section 102 which gates the particular code signal from the decoder sections into the various current switches.

FIGURE 1 shows the address register 30 connected to the buffer address register 28. This is also indicated in FIGURE 2 in which only a portion (one-half) of the address register buffer 28 is shown. The buffer register 28 consists of six bistable sections which are labelled for purposes of discussion $A_1$, $A_2$, $A_3$, $A_4$, $A_5$ and $A_6$, corresponding to the first six digits of a digital address received from the timing and control computer center 102 via a line 106. Since each of the six digits may either be a "1" or a "0," correspondingly labelled output lines from each of the sections of the buffer register 28 are connected to various combinations of inputs to the address registers 30. For example, lines representing the possibilities of "1" or "0" for the digits $A_6$ and $A_5$ are connected to inputs of the address register 30*a*. Similarly, lines representing the possibilities for digits $A_3$ and $A_4$ are connected into address register 30*b*. Digit $A_2$ is connected to address register 30*c*, and digit $A_1$ is connected to address register 30*d*. Each of the sections of the address buffer register 28 also receives a clock pulse input from the computer control center 102 via a line 108 which shifts the address through the register 28. The various sections of the address register 30 also receive a gate pulse from the computer control center 102 via line 110 to gate the information from register 28 to register 30. Address register 30*c* also obtains two complementary inputs from the outputs of address register 30*d* for purposes to be described in the following.

As indicated in FIGURE 2, the South current switches 65, 66, 67 and 68 are provided with secondary output terminals 112, 113, 114 and 115 which are connected through inverters (not shown) to four additional inputs of address register 30*a*. Similarly, the West switches 74 through 77 are provided with secondary outputs 164, 165, 166 and 167 which are connected to respective inputs of address register 30*b*. East current switches 70 through 73 are also provided with secondary outputs 300, 301, 302 and 303, which are connected to respective inputs of address register 30*d*. These outputs represent terminals on which appears a positive-going pulse each time the switch turns off.

Briefly describing the read operation with reference to FIGURE 2, an address consisting of 12 bits is received from the central control unit 102 at the input of the address buffer register 28 via serial input line 106. The first six bits of the address enter that portion of the address buffer register shown in FIGURE 2 for the purpose of selecting the first core in the selection matrix 53 and, therefore, the first row selection line linking storage elements in the main memory array 10. The remaining six bits of the address are used to provide access to an element in the column selection switch 26 in a manner equivalent to that described with reference to the even row selection switch 22. After being accumulated in the buffer register 28 under control of address line 106 and clock signals on line 108, the first six bits of the address are gated into the address registers 30*a*, 30*b*, 30*c* and 30*d* by means of a clock pulse occurring on line 110. In accordance with the values of these six address bits, the address registers present respective combinations of "1's" and "0's" to the decoders 32*a*, 32*b*, 32*c* and 32*d* upon the occurrence of a gate pulse on line 104. The logic decoders 32 interpret the signals received from the address registers 30 to select one switch from each of the four groups, North, East, South and West, of current switches. One column selection line and one row selection line will thus be energized to provide a coincidence of current through a single switching element 54. The first unit of current overcomes the bias which is produced by bias windings 84 and 90 and the second unit of current switches the core element 54 from one stable state to another. The switching of a selected element 54 induces a voltage in a selected one of the output windings 80. This voltage signal steers current from regulator 92 through one of the row selection lines 18R linking the memory array 10. Occuring simultaneously with the above operation is a similar selection of an odd row selection line in switch 24 and a column selection line 16R in switch 26. This simultaneous interaction of three read selection lines running into the memory 10 reads two of the storage elements therein.

As previously mentioned, the switch or selection means shown in FIGURE 2 is responsive to an address to locate the first two bits, one odd and one even, of a word being read from the main memory array 10. The selection means shown in FIGURE 2 is then responsive to the address to automatically locate the remaining bits of the word. This is accomplished by means of address changing signals fed to the address register including signals from the secondary outputs of the current switches of the East, West and South groups. The secondary outputs of the switches are fed to the associated address register for automatically changing the address and providing new information to the associated decoder. Thus, the secondary outputs of the West selection switches 74, 75, 76 and 77 are returned to the inputs of address register 32*b* to change the output information occurring on the four outputs. Decoder 32*b* thus receives a new combination of signals and selects a different West switch from that originally selected by the address entering buffer register 28. In a similar fashion, the North, East and South switches are also sequenced such that a new, but predetermined, current switch is energized during the next bit select time. Note tha bit-time here denotes period in which both odd and even bits are read. Since no current switch is selected twice in succession, it follows that no row or column selection line is ever energized twice in succession. This method advantageously prevents interference between resetting of a prior selected memory element 54 and a resetting of a newly selected core at the end of the new read time. This insures that the bias windings 84 and 90 will be effective to completely reset the selected memory elements 54 to the original state immediately following the read operation which set them. An additional advantage which is obtained from the sequencing operation of the current switches is a lowering of the duty cycle of the switches by insuring that no switch is turned on twice in succession; thus, the hea dissipation requirements of these components can be relaxed and the reliability of the system is increased. Further details of the switch sequencing process are pointed out with reference to the schematic diagrams of FIGURES 3 and 4.

From the foregoing description, it can be seen that the address register decoder 32 is effective to select a memory element in the array 53 upon the occurrence of a read pulse on line 104. At the end of the read pulse the decoders produce no output and the constant bias provided by windings 84 and 90 resets the previously selected core to its original state. The flux change produced by this resetting of the memory element is used to induce the write voltage in one of a plurality of write windings 116 which individually link the memory elements in the array 54. Although shown in abbreviated form, 256 write windings are provided corresponding to the 256 memory elements 54 in the array 53. As shown in FIGURE 2, the write windings 116 are each connected in series with a diode 118 and a write line 18W corresponding with that shown in FIGURE 1A. The group of 256 windings so connected are then connected in parallel to the source 64*b* on one side and to a "write 1" switch 120 on the other side. The write "1" switch 120 is connected via line 88 to the current regulator 92. The switch 120 also receives an enabling input from the timing and control center 102 via line 122. In addition, a "write 0" switch 126 is provided to connect a source 64*c* to the current regulator 92 upon receipt of an enabling input from the computer center 102 via a line 128. For the purpose of maintaining a constant bias during a write operation, a write switch 130 connects the source 64*d* to the bias winding 84 via line 132. This connection is made whenever a "Not Read" pulse is received from the computer 102 via line 134.

Briefly describing the write operation, it was previously mentioned that either a "1" or a "0" is to be restored to the memory element in accordance with the content thereof prior to the read cycle. Therefore, when the memory senses a "1" and wishes to restore a "1," a pulse is received on line 122 enabling the write "1" switch 120. Enabling of switch 120 allows current to be steered through the appropriate write line 18W whenever the output winding connected in series therewith receives a voltage pulse from the memory element 54 linked thereby. However, when the memory senses a "0" and wishes to restore the "0" to the selected core, the write "0" switch 126 is enabled by a pulse on line 128 to connect the source $64c$ to the bias windings 90. However, no pulse is received on line 122 to enable switch 120; therefore, no current can be steered through any one of the write windings 60 to cause a coincidence of current in the memory array 10. Accordingly, the particular element of the memory array 10 which is in the "0" state subsequent to the read operation remains in the "0" state after the write operation. It is apparent that the read-write operations are cyclic in nature.

*FIGURE 3*

Figure 3:
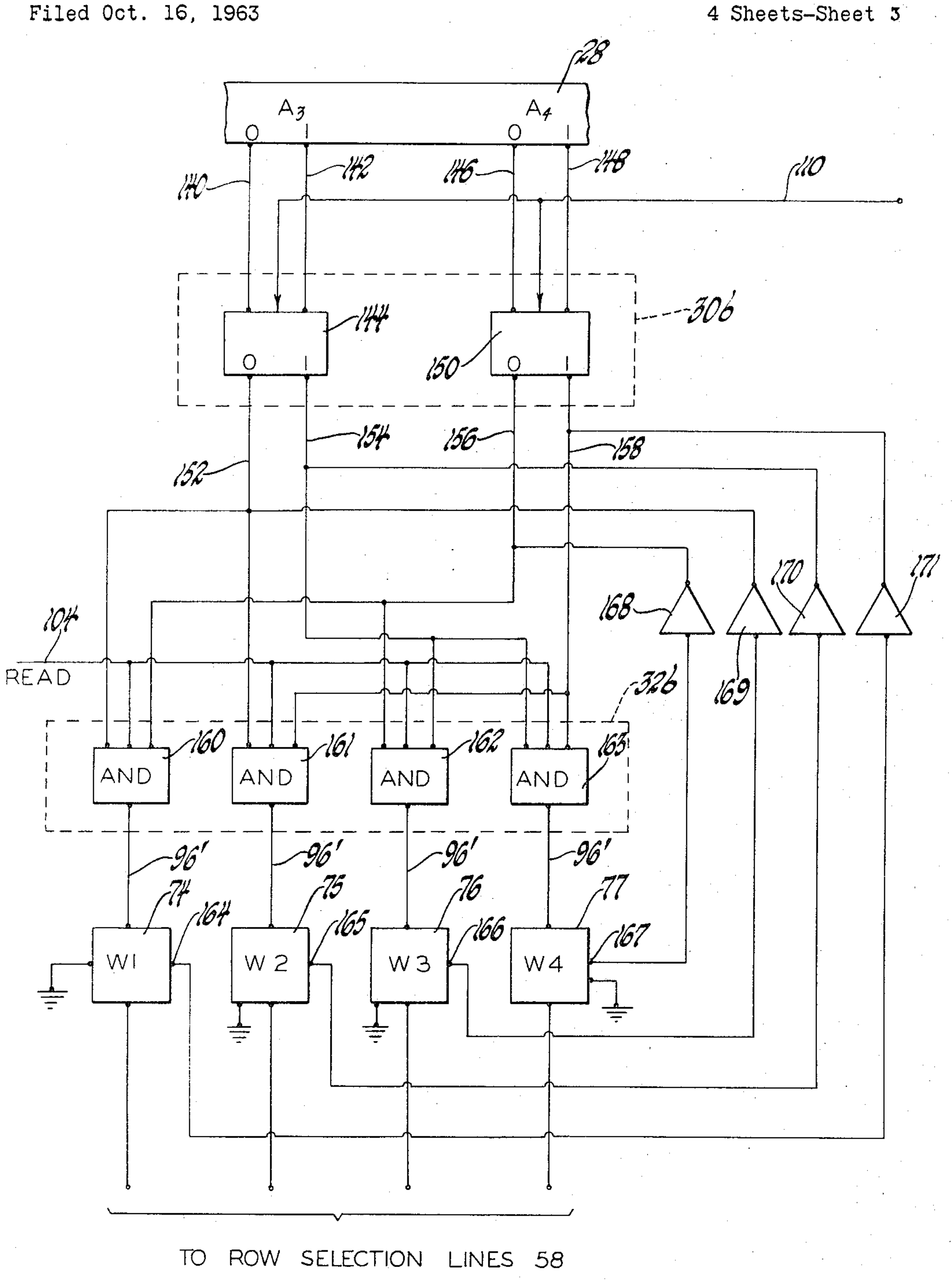
FIGURE 3 is a schematic diagram partially in block form of a specific means for carrying out the address decoding and automatic sequencing of the selection means as previously discussed.

FIGURE 3 shows in greater detail the elements of the address register 30, the decoder 32 and the respective interconnections with these elements and the West current switches 74, 75, 76 and 77. FIGURE 3, thus, is a representation of a specific means for performing the sequencing operation. As shown in FIGURE 3, the output lines for the third and fourth digits of the address as received in the buffer register 28 are connected into the address register $30b$. Output lines 140 and 142, representing the "0" and the "1" states respectively of the third digits, are connected to the inputs of a bistable device 144 which is responsive to an input on one of the lines 140 and 142 to be placed into a corresponding output state. Similarly, input lines 146 and 148, representing the "0" and "1" states of the fourth digit in the address buffer register 28, are connected to a bistable device 150 in the address register $30b$. Bistable device 150 is similar to device 144. Output lines 152 and 154, representing the "0" and "1" states respectively of the bistable device 144, as well as output lines 156 and 158 respectively representing the "0" and "1" states of bistable device 150, are connected to the inputs of the decoder $32b$. As shown, the decoder $32b$ comprises four AND gates 160, 161, 162 and 163, each of which has three input terminals. The inputs to AND gate 160 include lines 152 and 156. The inputs to AND gate 161 include lines 152 and 158. The inputs to AND gate 162 include lines 154 and 156. To complete the decoding arrangement, the inputs to AND gate 163 include lines 154 and 158. Thus, it can be seen that the four AND gates 160 through 163 are connected to all the different combinations of the lines 152, 154, 156 and 158 from the address register $30b$. Finally, a gating input to each of the AND gates 160 through 163 is received in the form of a "READ" pulse on line 104, which corresponds to the similarly numbered line appearing in FIGURE 2. The respective outputs of the AND gates 160 through 163 are connected via similarly numbered lines 96' to the West current switches 74 through 77 respectively. In the manner suggested by FIGURE 2, the output of each of the West switches 74 through 77 are connected to exclusive groups of four row selection lines 58, which run through the array 53 of memory elements 54 in the selection system of FIGURE 2. The ground connections shown in FIGURE 3 are representative of the ground connections shown in FIGURE 2 via line 88, bias winding 90 and current regulator 92. In addition, secondary outputs 164, 165, 166 and 167 of the West switches 74, 75, 76 and 77, respectively, are connected through individual inverters 168, 169, 170 and 171 to the four output lines 156, 152, 154 and 158 of the address register $30b$ for the purpose of changing the address received from the register $30b$ at the input of the decoder $32b$.

Briefly describing the operation of the apparatus shown in FIGURE 3, the digital address is gated into the bistable devices 144 and 150 of the address register $30b$ from the address buffer register 28 by a gate pulse on line 110. The address register $30b$ then enables one of the AND gates in the decoder $32b$ according to whichever AND gate receives two active inputs. The READ pulse occurring on line 104 then gates the enabled AND gate to activate the corresponding West current switch to allow energization of one of the groups of row selection lines 58. At the end of the read cycle, the pulse appearing on line 104 is removed, thus, turning off the previously actuated current switch. Turning off the current switch reflects a negative-going pulse through one of the associated inverters 168 through 171, thus, changing the character of the signal appearing on one of the lines 152, 154, 156 or 158. The state of the bistable device, either 144 or 150, which receives the signal from one of the inverters, is thus reversed thereby enabling a different AND gate in the decoder $32b$ and a different one of the West selection switches 74 through 77. In this manner, the current switches 74 through 77 are activated sequentially, once each four bit times and three times in one twelve bit word time. As previously indicated, any one of the four current switches 74 through 77 may be selected first, depending upon the original address. Selection of the three remaining current switches then follows in a predefined sequence which is described below. It is apparent that the gate pulse appearing on line 110 is applied once only at the beginning of each word time and is effective to gate the binary bits in the address buffer register 28 into both sides of the address register $30b$. The READ pulse appearing on line 104 is applied at the beginning of the read cycle and is removed at the end of the read cycle in each bit time.

Considering a specific example in greater detail, assume the initial address from the address buffer register of the third and fourth digits to be both binary "1's." In this case, when the gate pulse appearing on line 110 transfers the binary information into the address register $30b$, output line 154 is negative with respect to line 152 and line 158 is negative with respect to line 156. The negative polarity signals appearing on lines 154 and 158 are effective to enable AND gate 163; however, none of the other AND gates 160, 161 and 162 receives a coincidence of negative signals and, therefore, none of them is enabled. At the beginning of the first bit time, the pulse occurring on line 104 gates the enabled AND gate 163 to actuate the West current switch 77. Current is thus directed through one of the four row selection lines 56 associated with the West current switch 77, depending upon which particular East current switch 70 through 73 is actuated in a similar fashion.

At the end of the read cycle, the pulse appearing on line 104 is removed, thus, turning off current switch 77. Turning off the switch transmits a positive-going signal from the secondary output 167 to the inverter 168. As a result, the state of binary device 150 is reversed such that line 156 is now negative with respect to line 158. At this point, AND gate 162 is the only AND gate in the decoder $32b$ to receive two negative inputs; thus, the West current switch 76, which is connected with the AND gate 162, is actuated. The read pulse occurring on line 104 again completes the current switch actuation process and at the removal thereof, transmits a positive-going pulse to inverter 169. This positive-going pulse causes a reversal in the state of binary device 144, thus, again changing the address to the decoder $32b$. This process continues such that the West current switches are actuated in a sequence of 77, 76, 74, 75, or 74, 75, 77, 76, and so forth, depending upon the original address.

*FIGURE 4*

Figure 4:
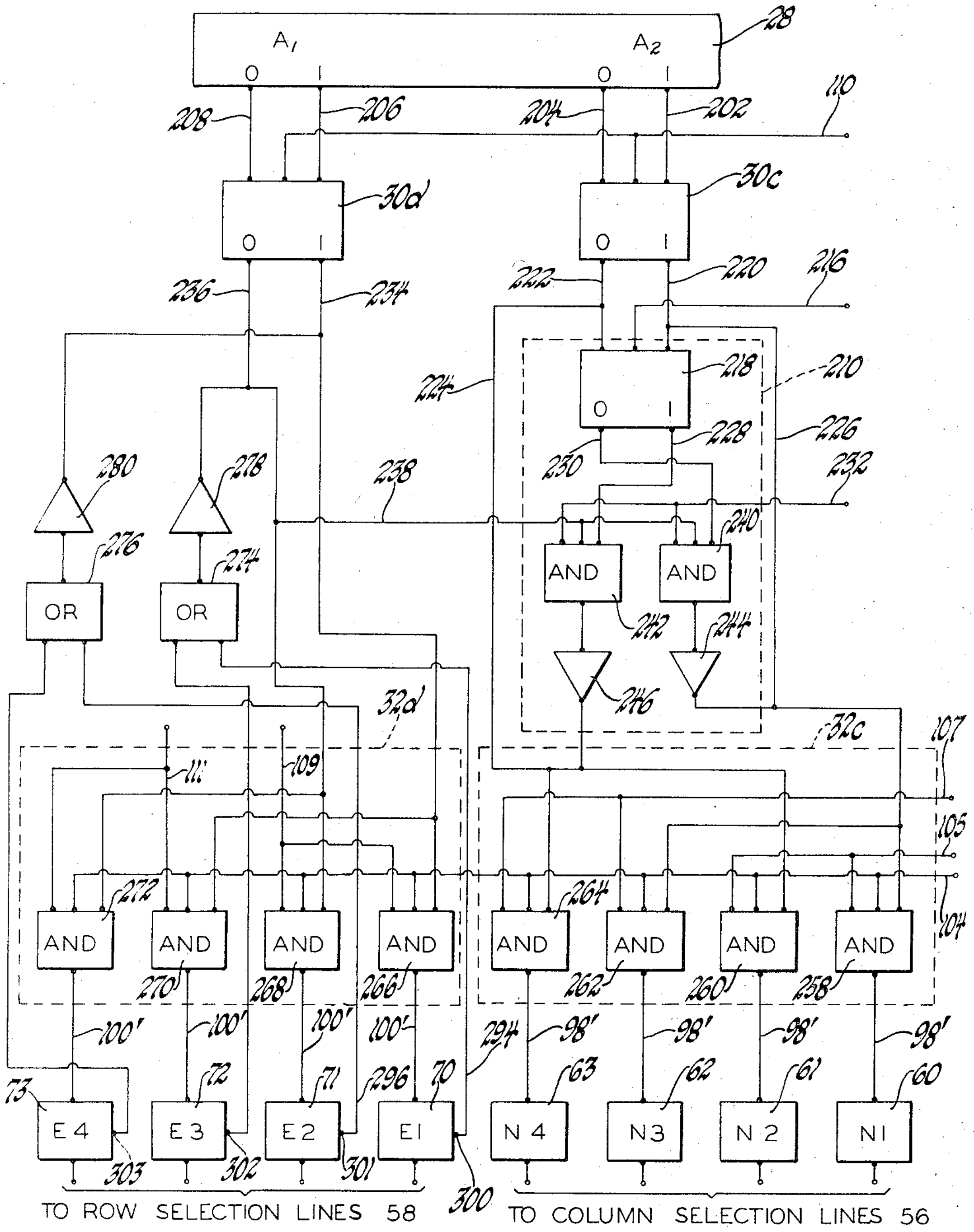
FIGURE 4 is a schematic representation partially in block form of a further means for carrying out the decoding and sequencing operation of the selection means.

Referring now to FIGURE 4, a detailed description of a specific means for effecting the sequencing operation of the North and East current switches is made.

FIGURE 4 shows that portion of the address buffer 28 which receives the first two digits of the address. Lines 202 and 204 connect the respective "1" and "0" values of the second digit to the input of the address register $30c$ which consists of a single bistable device. Lines 206 and 208 connect the "1" and "0" values of the first digit to the address register $30d$, which also consists of a single bistable device. Each of the address registers $30c$ and $30d$ are connected to receive a gate pulse which appears on a line 110. The output of address register $30c$ is connected by means of a "1" output line 220 and a "0" output line 222 to a logic circuit 210 which controls the changing of state of address register 30*c*. The output of the logic circuit 210 is connected through the decoder 32*c* and lines 98′ to the four North current switches 60, 61, 62 and 63. The North current switches 60 through 63 are, in turn, connected to respective groups of four column selection lines 56 of the matrix 52 as better shown in FIGURE 2.

The output of address registers 30*d*, which corresponds with the first digit of the address. is connected to the decoder 32*d* by means of the "1" output line 234 and the "0" output line 236. The output of the decoder 32*d* is connected through lines 100′ to the four East current switches 70, 71, 72 and 73. The East current switches are, in turn, connected to respective groups of four row selection lines 58 as is also indicated in greater detail in FIGURE 2.

Describing the system of FIGURE 4 in greater detail, the logic circuit 210 is shown to include a secondary address register 218 which is a bistable device having "0" and "1" stages. The "1" side of the register 218 is connected to the "1" side of register 30*c* by means of line 220, and the "0" side of register 218 is connected to the "0" side of register 30*c* by means of line 222. The "0" side of register 30*c* is also connected by means of line 224 to the input of the decoder 32*c*. Similarly, the "1" side of register 30*c* is connected via line 226 to the input of decoder 32*c*. A gating impulse is receivable by register 218 on a line 216 which connects the register 218 with the computer control center 102 shown in FIGURE 2. The "1" output of register 218 is connected via line 228 to a first input of an AND gate 242. The "0" side of register 218 is connected via line 230 to the first input of a second AND gate 240. A second input to each of the AND gates 240 and 242 is received on a line 232 and consists of a clock pulse from the computer. A third input which consists of an enabling impulse to the AND gates 240 and 242 is received via line 238 from the "0" stage of address register 30*d*. The output of AND gate 240 is connected to the input of an inverter 244. The output of the inverter 244 is connected to line 226 for changing the state of the address register 30*c*. The output of AND gate 242 is connected to an inverter 246, the output of which is connected to line 224 for changing the state of address register 30*c* and also as an input of the decoder 32*c*.

The decoder 32*c* is seen to consist of four AND gates 258, 260, 262 and 264. AND gates 258 and 262 receive a first input via line 226 from the discriminator circuit 210 and the address register 30*c*. A second input to the AND gates 258 and 262 is provided by line 104 which carries the aforementioned READ pulses. Line 104 is also connected to the other AND gates 260 and 264. An input for each of the AND gates 258 and 260 consists of a pulse which is received from the computer control center 102 on a line 105. A line 107, which carries a signal complementary to that carried by line 105, and is also obtained from the computer control center in a predetermined fashion is connected to the inputs of gates 262 and 264. Line 107 is also connected to AND gate 264. This gate also receives an input from line 224.

Decoder 32*d* consists of a plurality of AND gates 266, 268, 270 and 272, each of which is provided with three inputs. A first input to each of the AND gates consists of the READ pulse provided on line 104. Additionally, line 234 from the address register 30*d* is connected to the inputs of AND gates 266 and 270. The "0" side of address register 30*d* is connected via line 236 with the inputs to AND gates 268 and 272. The final input to AND gates 266 and 268 is received on line 109 from the computer control center 102. An input which is complementary to that received on line 109 is connected to the final input of AND gates 270 and 272 via line 111.

To provide the address sequencing function, the secondary output 300 of the East switch 70 is connected via line 294 to the first input of an OR circuit 274. The secondary output 302 of East switch 72 is connected to the other input of OR circuit 274. Similarly, the secondary outputs 301 and 303 of switches 71 and 73 are connected to the inputs of an OR gate 276. The output of OR gate 274 is connected through an inverter 278 to the "0" output line of address register 30*d* to change the state thereof. Similarly, the output of OR gate 276 is connected through an inverter 280 to the "1" output line 234 of address register 30*d*.

Discussing the operation of the apparatus shown in FIGURE 4, it is assumed that the initial address is such that the first two digits are "1's." Therefore, the conditions at the output terminals of the address register 30*c* after a gate pulse appears on line 110 are such that line 220 is negative with respect to line 222 and line 234 is negative with respect to line 236. Also as an initial condition it is assumed that the signal on line 105 is negative with respect to that on line 107. At a rate corresponding with the bit time rate, and beginning with the first bit time, lines 105 and 107 are alternately negative and positive with respect to each other. Similarly, it is assumed that lines 109 and 111 are alternately negative at one-half the bit time rate and that line 109 is initially negative with respect to line 254. As a consequence to these initial conditions, AND gate 258 in decoder 32*c* receives two negative inputs and is enabled thereby. Similarly, AND gate 266 and decoder 32*d* is enabled. Upon the occurrence of a READ pulse from line 104, the North current switch 60 is actuated and the East current switch 70 is actuated to steer current through the associated column and row selection lines respectively. During the read cycle, the output condition of address register 30*c* is gated into the secondary register 218 by a clock pulse occurring on line 216. At the end of the read cycle, and upon the termination of the READ pulse on line 104, the East switch 70 introduces a positive-going pulse into line 294 which is transmitted through OR gate 274, AND gate 278 to the output line 236 of the register 30*d* to change the state thereof. Thus, line 236 becomes negative with respect to line 234. Upon the occurrence of a clock pulse on line 232, AND gate 242 of the discriminator circuit 210 receives a triple coincidence of negative signals at the input thereof and a signal is generated in inverter 246 and returned through line 224 through the "0" stage of address register 30*c*. Therefore, the output state of register 30*c* is reversed.

At the second bit time, the following conditions exist at the output terminals of the address registers 30*c* and 30*d*. Line 222 is negative with respect to line 220, and line 236 is negative with respect to line 234. Also, as previously mentioned, line 107 is negative with respect to line 105, and line 109 is still negative with respect to line 111. Under these conditions, AND gate 264 in decoder 32*c* and AND gate 268 in decoder 32*d* are enabled. The occurrence of a READ pulse on line 104, which is simultaneously transmitted to all of the AND gates of the decoders 32*c* and 32*d*, gates the enabled AND circuits 264 and 268, thereby actuating the North current switch 63 and the East current switch 71. Again, the address existing in register 30*c* is gated into the secondary register 218 by means of the pulse on lines 216. At the end of the read cycle, the East current switch 71 reverses the state of register 30*d* via line 296, OR gate 276 and inverter 280, such that line 234 is negative with respect to line 236. The conditions at the output terminal of the secondary register 218 are at this time such that output line 230 is negative with respect to line 228. However, line 238 is held positive by register 30*d* which disables both AND circuits 240 and 242. The state of register 30*c* is not changed under these conditions.

At the third bit time, the output conditions of the address registers are such that line 234 is negative with respect to line 236, and line 222 is negative with respect to line 220. The signal appearing on lines 107 and 105 is again complemented such that line 105 is negative, and also, the signal appearing on lines 109 and 111 is complemented such that line 111 is negative. Under these conditions, AND gates 260 and 270 in decoder 32*c* and 32*d* are enabled. The READ pulse appearing on line 104 again gates the enabled AND circuits to actuate the North current switch 61 and the East current switch 72. As occurred in previous operations, the address existing in register 30*c* is gated into the secondary register 218 by a clock pulse on line 216. At the end of the read cycle, the East current switch 72 reverses the state of register 30*d* via line 298 and OR circuit 274 so that line 236 becomes negative with respect to line 234.

At the secondary register 218 of logic circuit 210, line 230 is, at this point, negative with respect to line 228. Line 238 is also negative permitting the delayed clock pulse on line 232, which occurred during the write cycle, to gate the AND circuit 240. The output of AND circuit 240 thus reverses the state of register 30*c* via inverter 244.

At the fourth bit time, registers 30*c* and 30*d* are set such that line 220 is negative with respect to line 222, and line 236 is negative with respect to line 234. The signals appearing on lines 105, 107 are again complemented at clock time and, thus, lines 107 and 111 are both negative. Under these conditions, the AND circuits 262 and 272 in the decoders 32*c* and 32*d* are selected. Upon the occurrence of a READ pulse 104, the enabled AND gates actuate the associated current switches, which are North current switch 62 and East current switch 73. During the read cycle, the clock pulse on line 216 again gates the address from register 30*c* into the secondary register 218. At the termination of the read cycle, the East current switch 73 reverses the state of address register 30*d* via OR circuit 276. As before, line 238 is positive, AND circuits 240 and 242 are disabled and the state of register 30*c* remains unchanged.

At the fifth and ninth bit times, the addresses at registers 30*c* and 30*d* are identical to those of the first bit times. The sequence of both the North and East current switches after the fifth and ninth bit times are identical to that in bit times one through four.

From the foregoing descriptions of the apparatus shown in FIGURES 3 and 4, it can be seen that the sequence of the current switches is dependent upon the conditions of the initial address. Once the initial address is gated into the address registers to randomly select the first coincident combination of row and column lines for energization, thus to select a first storage element in the memory array 10, the current switches are subsequently cycled such that no switch is operated more than once in every four bit times, and no more than three times in each twelve bit word time.

To avoid redundant descriptive matter, the sequencing of the South current switches, which occurs in a manner similar to that of the West current switches, is omitted. Similarly, various details of the internal construction of the North, East, South and West current switches, along with various other well known electrical components, such as AND gates, OR gates and the like, are not described since the specific structure of these elements may vary according to the requirements of the circuit designer, and can be implemented by the exercise of ordinary skill in the art.

While the memory system and the associated selection means have been described in great detail with reference to specific embodiments thereof, it is to be understood that the invention is subject to modification and improvement, and that the foregoing description is not to be taken in a limiting sense. For a definition of the invention, reference should be made to the appended claims.

What is claimed is:

1. A coincident current memory comprising a two-dimensional array of magnetic elements having two stable remanent states, a plurality of column selection lines linking respective columns of elements and a plurality of row selection lines linking respective rows of elements, means for receiving an address for access to the array, means for decoding the address and for simultaneously energizing a column selection line and a pair of row selection lines respectively representing individual bits of the word addressed.

2. A coincident current memory system comprising a two-dimensional array of magnetic storage elements having two stable remanent states, a power supply, a plurality of column selection lines linking respective columns of the elements, first switching means connected to the column selection lines for selectively directing current from the supply through a selected column line, a plurality of row selection lines linking respective rows of the elements, second switching means connected to a portion of the row selection lines for selectively directing current from the supply through a selected row line, third switching means connected to the remaining row selection lines for selectively directing current from the supply through a selected one of said remaining lines, address decoding means connected to the switching means and responsive to a digital address to energize the first switching means in response to certain bits of address and to simultaneously energize the combination of the second and third switching means in response to certain other bits of the address.

3. A computer memory comprising a two-dimensional array of magnetic core elements having two stable remanent states, a current source, a plurality of column selection read lines linking respective columns of the elements, first switching means for selectively directing a quantity of current through the column lines, a plurality of row selection read lines linking respective rows of the elements, second switching means connected to a portion of the row selection read lines for selectively directing a quantity of current therethrough, third switching means connected to the remaining row selection read lines for selectively directing a quantity of current therethrough, the current quantities being selected such that a coincidence of two current quantities through a single element are required to switch the element between the two remanent states, address means for receiving a digital address for access to the memory, and decoding means connecting the address means to the switching means and responsive to the address to simultaneously select for energization a column selection line of the first switching means, and a row selection line of each of the second and third switching means thereby to simultaneously read two elements of the memory.

4. A computer memory as defined by claim 3, the combination further including, a first plurality of column selection write lines linking respective columns of elements, means connecting the column selection write lines to the current source, second and third pluralities of row selection write lines linking respective rows of elements, corresponding to the row selection read lines of the second and third switching means respectively, means connecting the second and third pluralities of row selection write lines to the current source, for directing current through the column and row selection write lines following selection of the column and row selection read lines to thereby write digital information of a first character into the selected elements.

5. A computer memory as defined by claim 4 including means to selectively inhibit the energization of the row selection write lines to thereby write digital information of a second character into the selected elements.

6. A computer memory as defined by claim 3 including a plurality of sense lines, each of the sense lines linking the elements of a predetermined segment of the two-dimensional array, a first plurality of amplifier means connected to the sense lines linking elements associated with the second switching means and a second plurality of amplifier means connected to the sense lines linking elements associated with the third switching means, each of the amplifier means being connected to a plurality of sense lines associated with segments of the array having mutually exclusive combinations of row and column selection lines.

7. A coincident current memory system including a two-dimensional array of magnetic memory elements having two stable remanent states, a plurality of column selection lines linking respective columns of elements, a plurality of row selection lines linking respective rows of elements, first addressable selection means for selecting a column selection line for energization, second and third addressable selection means for selecting a pair of row selection lines for energization, each of the selection means comprising a two-dimensional array of switching elements having two stable remanent states, address decoding means for switching a selected switching element in response to a digital address, a plurality of output windings linking individual switching elements and responsive to the switching of the linked element to develop an output signal, and circuit means connecting the output windings of the first selection means to the column selection lines, the second selection means to certain of the row selection lines and the third selection means to other of the row selection lines.

8. A coincident current memory system including a two-dimensional array of magnetic memory elements having two remanent states, a plurality of column selection lines linking respective columns of elements, a plurality of row selection lines linking respective rows of elements, first addressable selection means for selecting a column selection line for energization, second and third addressable selection means for selecting a pair of row selection lines for energization, each of the selection means comprising a two-dimensional array of magnetic switching elements having a high remanence, coincident current means to select an element to be switched including a plurality of lines linking respective columns of switching elements, a plurality of lines linking respective rows of switching elements, a current source, and switching means for connecting the source with individual lines, decoding means for receiving a digital address and actuating the switching means to pass current through a row and column line to switch a core corresponding with the address, a plurality of output windings linking the switching elements for developing an output signal when the element linked thereby switches, and circuit means connecting the output windings of the first, second and third selection means to the column selection lines, a portion of the row selection lines and the remaining row selection lines, respectively.

9. In a memory system for digital devices, addressable selection means comprising a two-dimensional array of magnetic elements having two states, a plurality of lines linking respective columns of elements and a plurality of lines linking respective rows of elements, a source of current, selectively actuable switch means for connecting the source to the row and column lines, decoding means responsive to a digital address for actuating the switch means to coincidently connect the source to a row and column line, the decoding means including a register for receiving an address in series binary form, row and column decoders each including a plurality of bistable devices for receiving respective portions of the address in parallel binary form, a plurality of gates, the bistable devices being connected to the switch means through the gates whereby the address contained in the bistable devices determines the actuation of the switch means, and a plurality of inverter means connected between the switch means and the bistable devices in a predetermined logic pattern to sequentially change the states of the bistable devices thereby to automatically actuate the switch means in an order related to the address.

10. In a memory system for digital information processing systems, addressable selection means comprising a two-dimensional array of magnetic core elements having two stable remanent states, a plurality of column selection lines linking respective columns of elements, a plurality of row selection lines linking respective rows of elements, a current source, a plurality of selectively actuable switches for connecting the source to the column selection lines, a plurality of selectively actuable switches for connecting the source to the row selection lines, bias means to maintain the elements in one of the remanent states, bias means being selected such that a coincidence of current through the row and column line of an element is required to switch the element to the other remanent state, addressable decoding means connected to the switches and responsive to a digital address to actuate first row and column switches to coincidently connect the source to first row and column lines corresponding to the address, the decoding means including a register for receiving an address in series binary form, row and column decoders each including a plurality of bistable devices for receiving respective portions of the address in parallel binary form, a plurality of gates, the bistable devices being connected to the switches through the gates whereby the address contained in the bistable devices determines the actuation of the switches, and a plurality of inverter means connected between the switches and the bistable devices in a predetermined logic pattern to sequentially change the states of the bistable devices thereby to automatically actuate the switches in an order related to the address.

11. Addressable selection apparatus as defined in claim 10 including a first plurality of output windings linking individual elements for developing a first output signal when the elements linked thereby are switched from one remanent state to the other, and a second plurality of output windings linking individual elements for developing a second output signal when the elements linked thereby are switched back to one remanent state.

12. Addressable selection apparatus as defined in claim 11 including storage means comprising a plurality of memory elements containing binary digital information, circuit means connecting the first plurality of output windings to the memory elements for extracting the stored information upon occurrence of a first output signal, and circuit means connecting the second plurality of output windings to the memory elements for inserting information upon occurrence of a second output signal.

References Cited

UNITED STATES PATENTS 3,273,126 9/1966 Owen ---------- 340—172.5

ROBERT C. BAILEY, *Primary Examiner.*

R. ZACHE, *Assistant Examiner.*